Sept. 4, 1928.
J. E. BODA
1,683,018
UNIVERSAL AGRICULTURAL IMPLEMENT
Filed Sept. 25, 1922    11 Sheets-Sheet 1
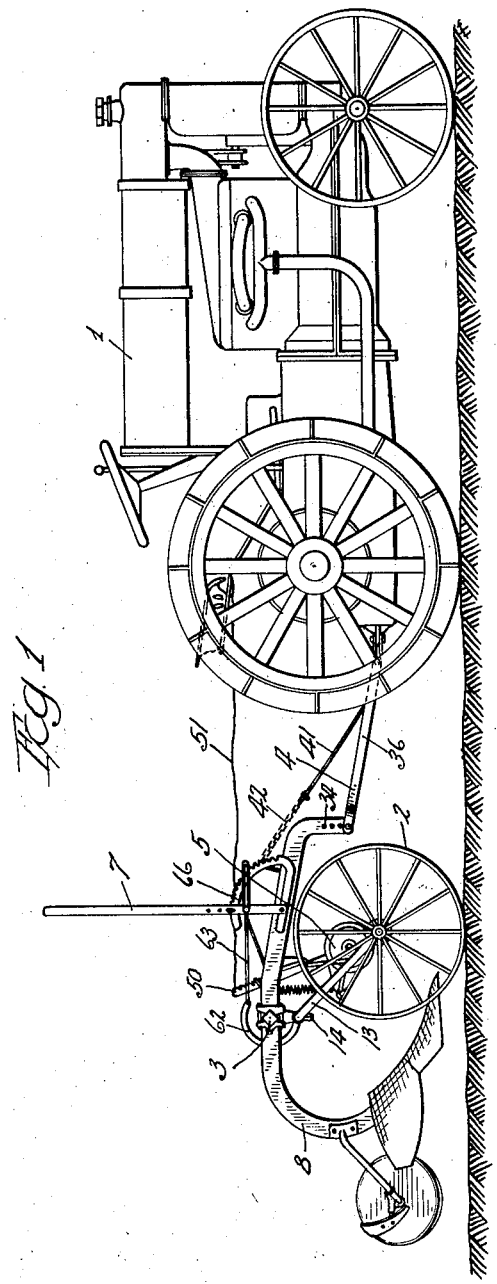
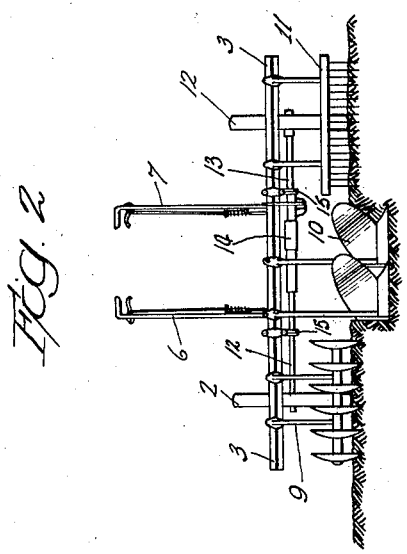
Inventor:
Joseph E. Boda
by L. C. Shouts    Atty.

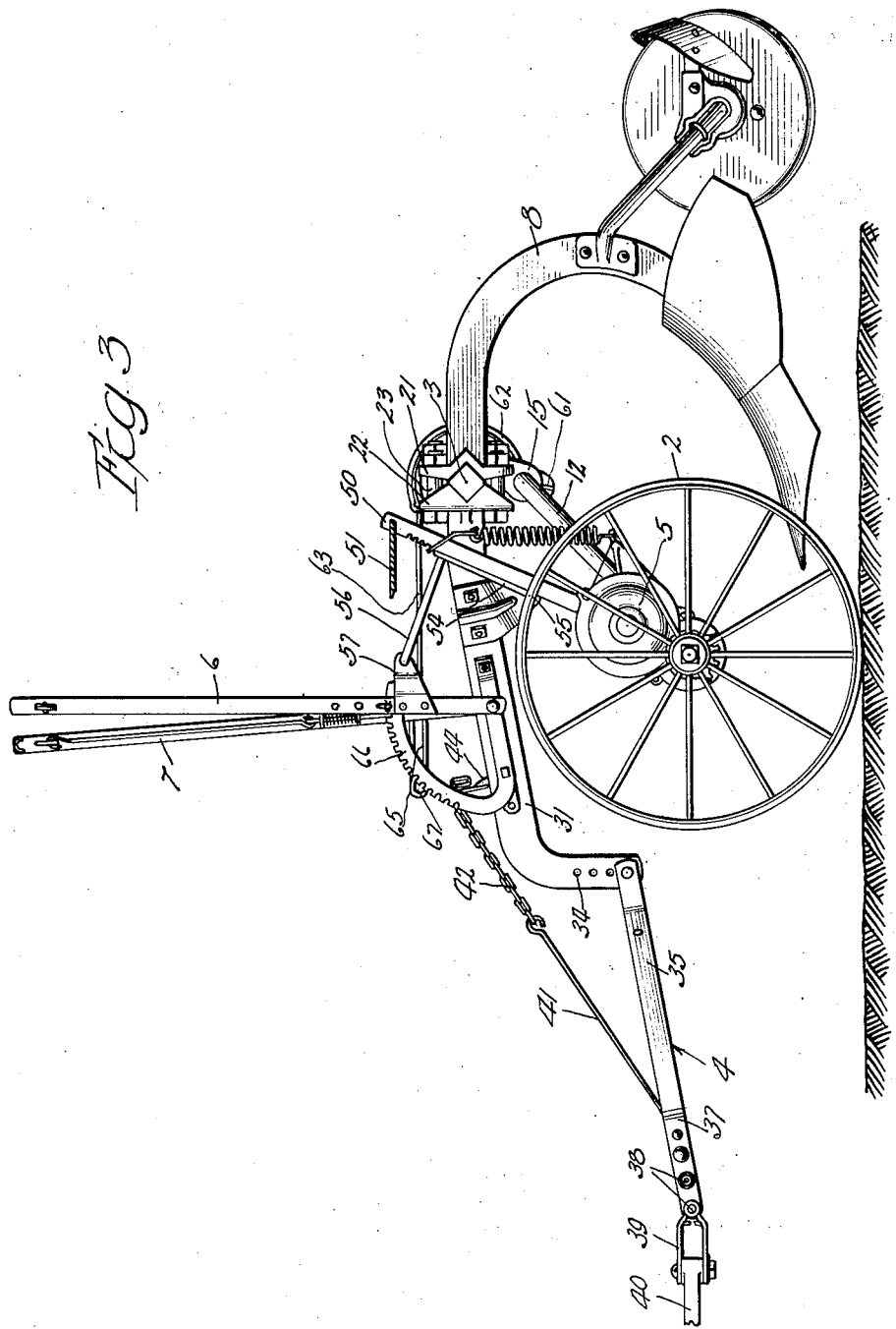

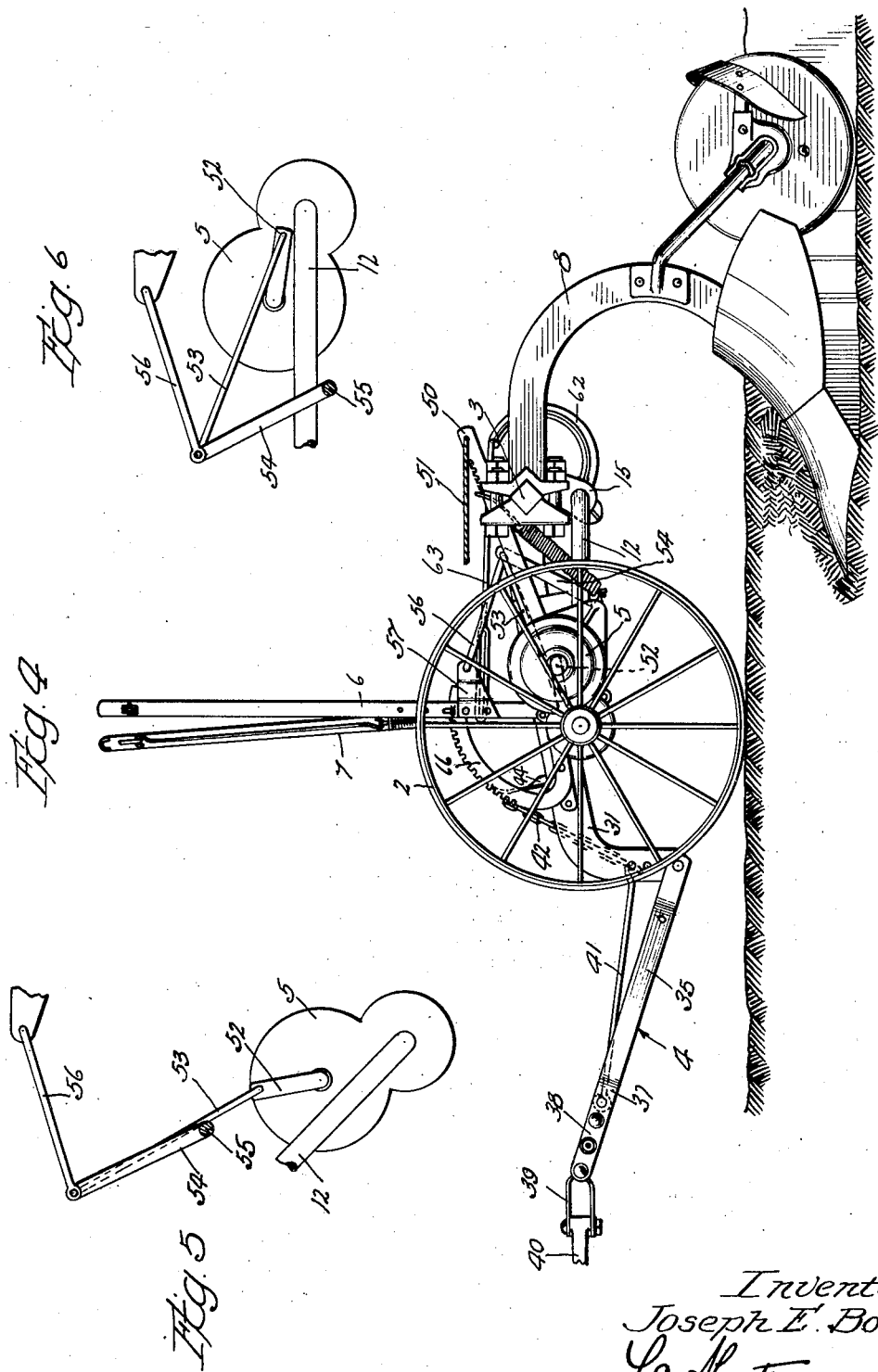

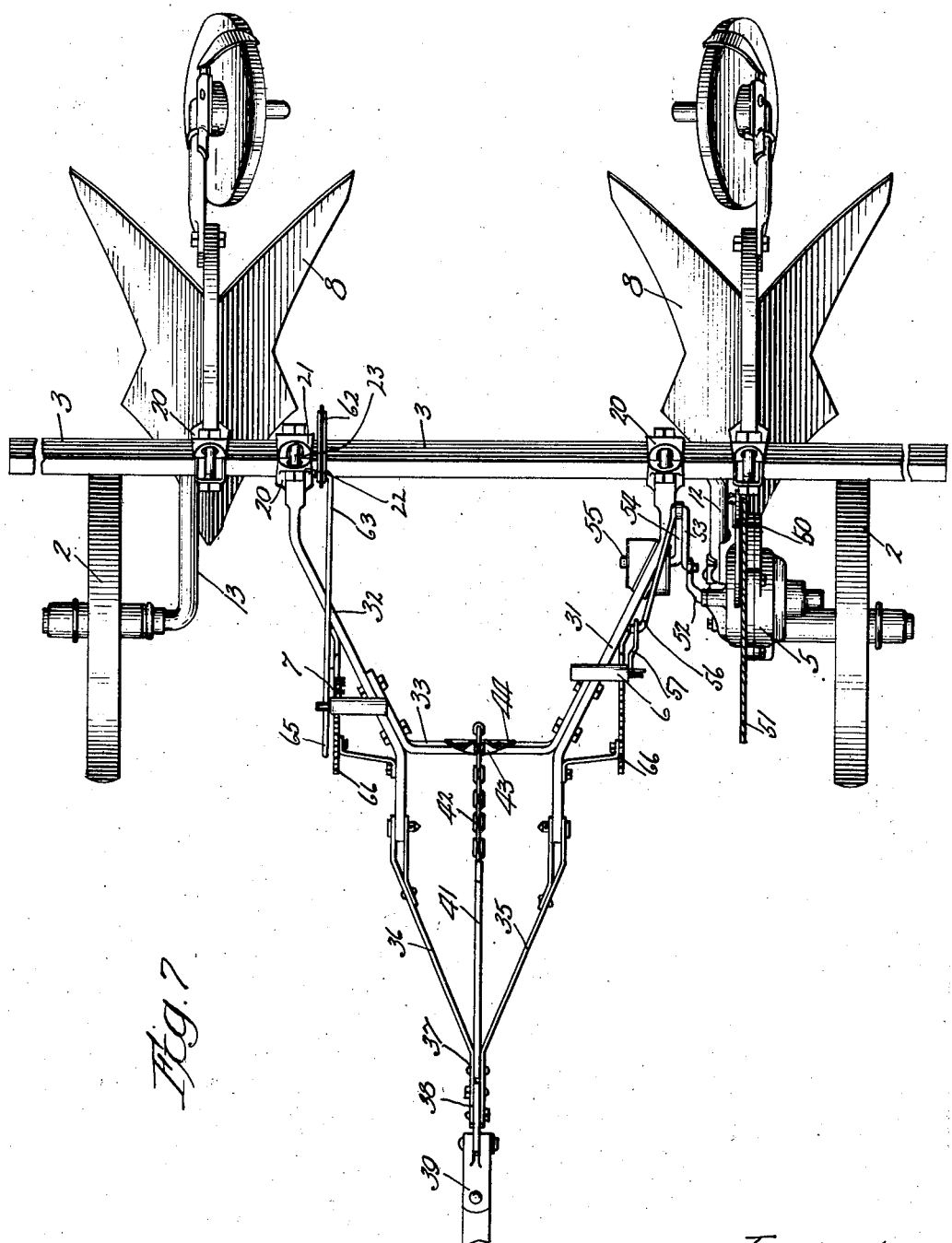

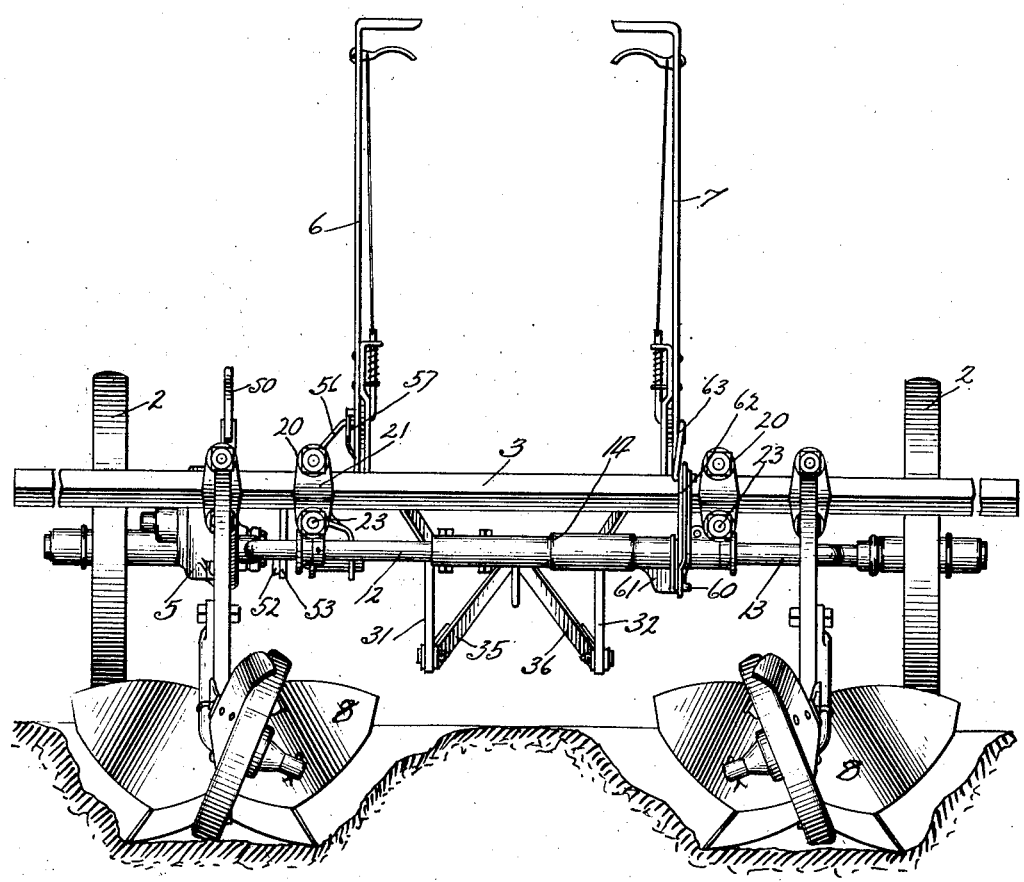

Sept. 4, 1928.　　　　　　　　　　　　　　1,683,018
J. E. BODA
UNIVERSAL AGRICULTURAL IMPLEMENT
Filed Sept. 25, 1922　　11 Sheets-Sheet 6

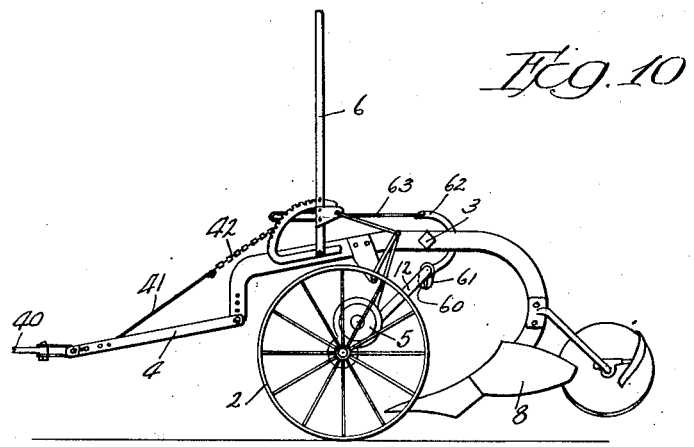
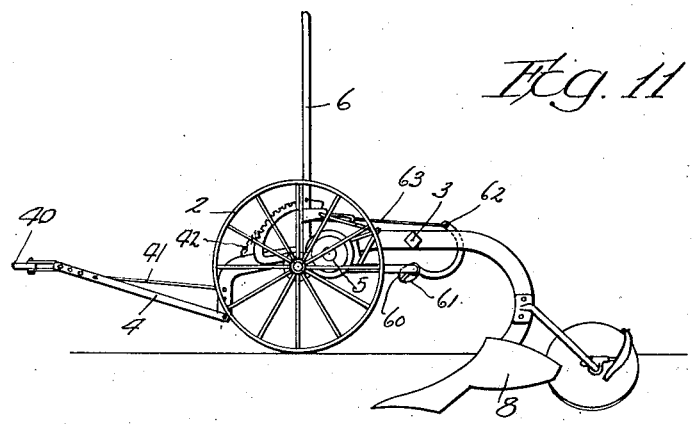
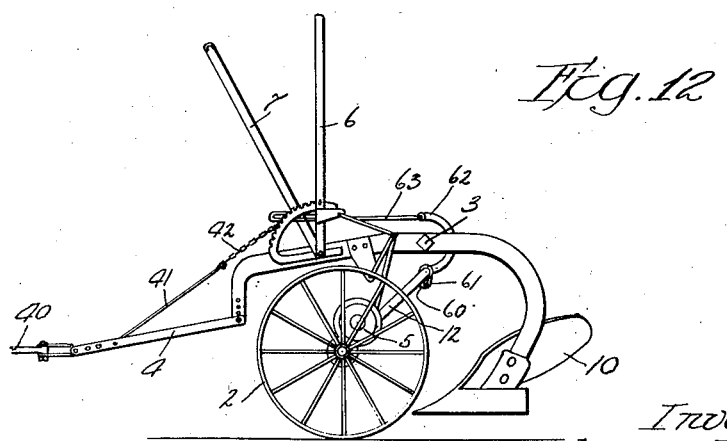

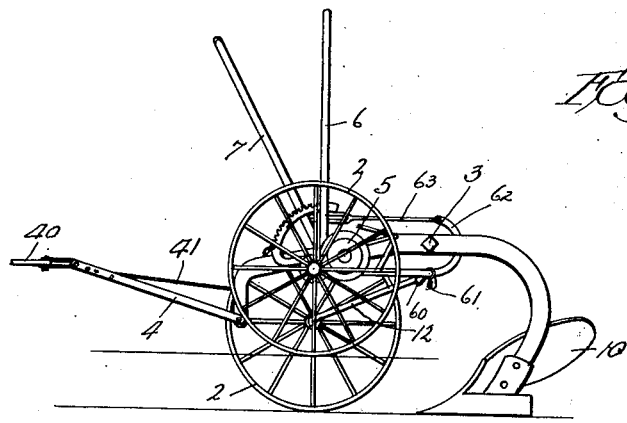
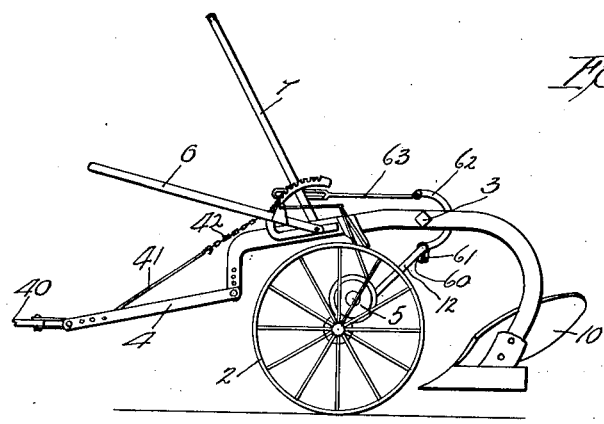
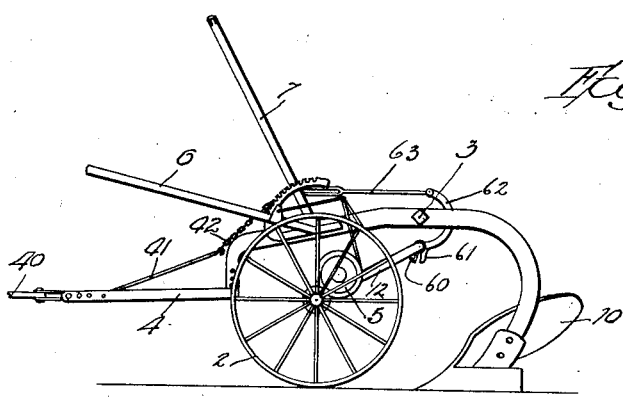

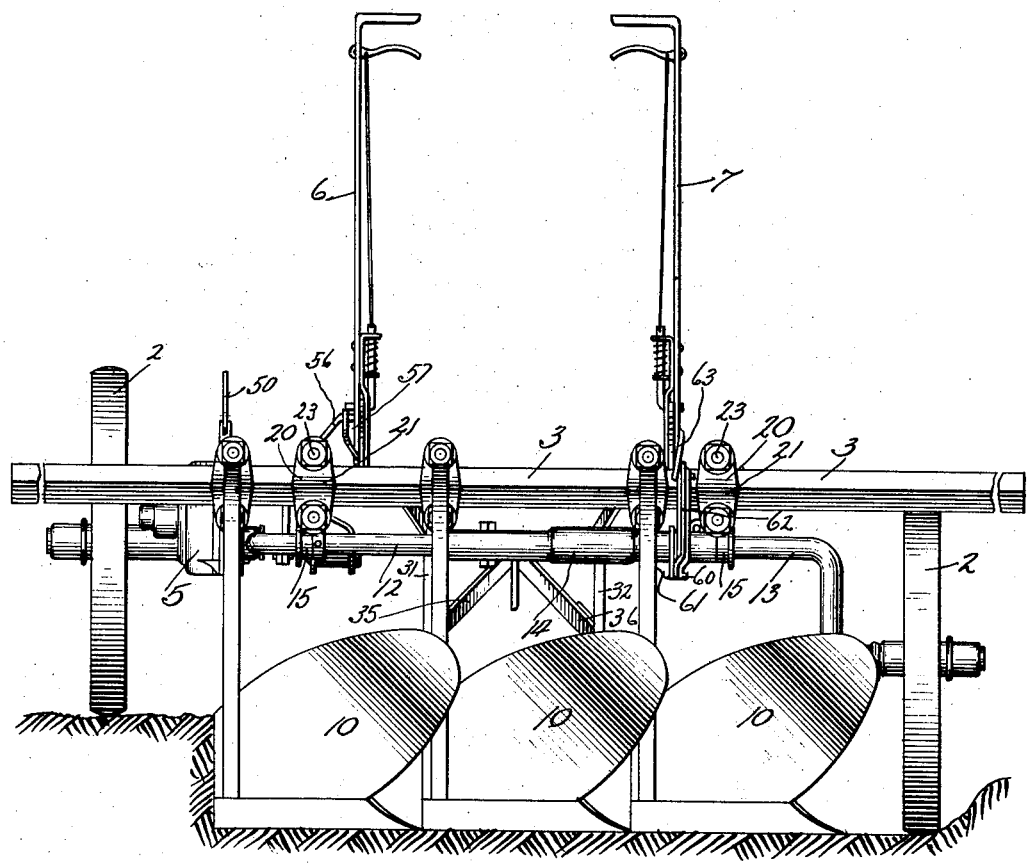

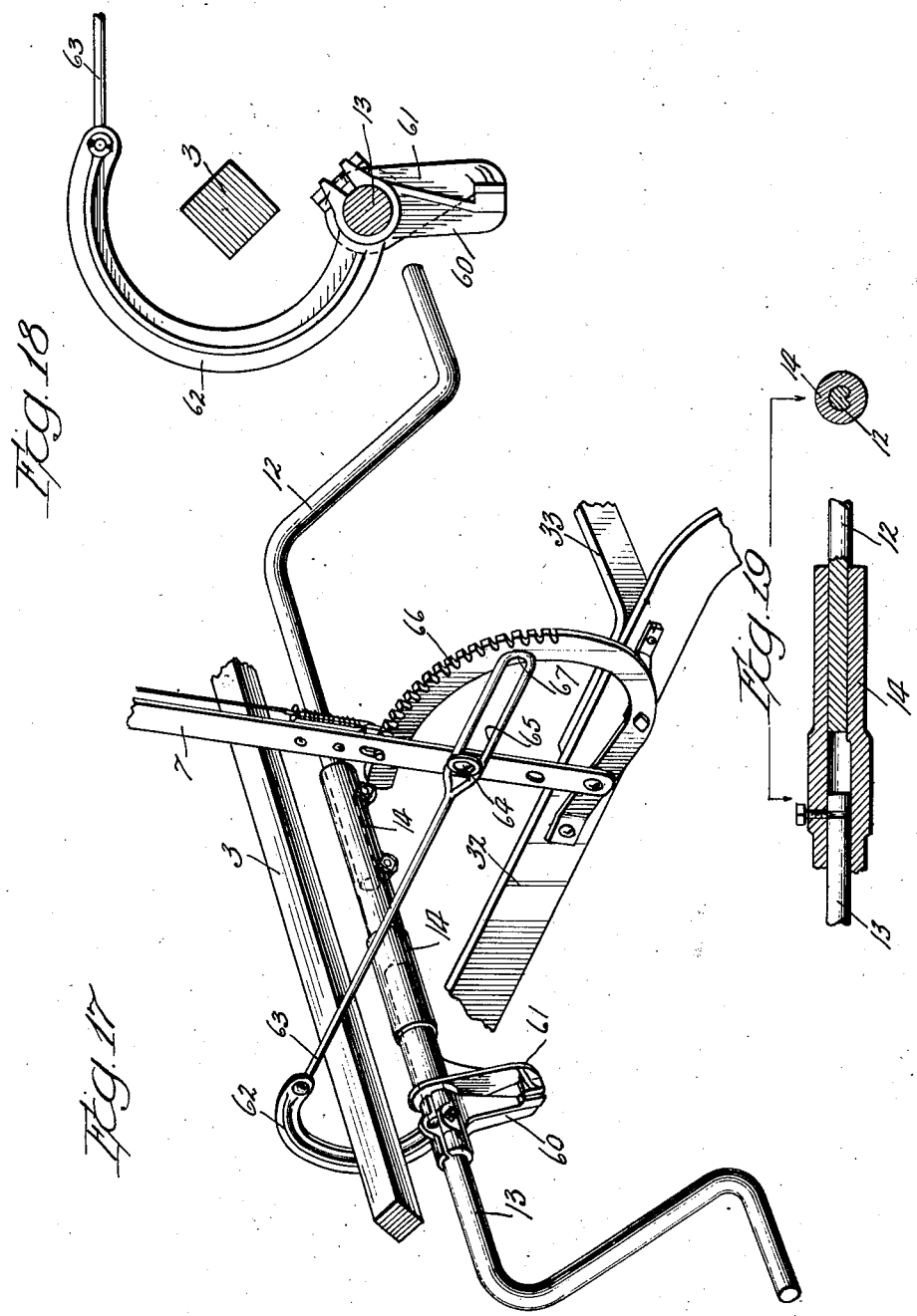

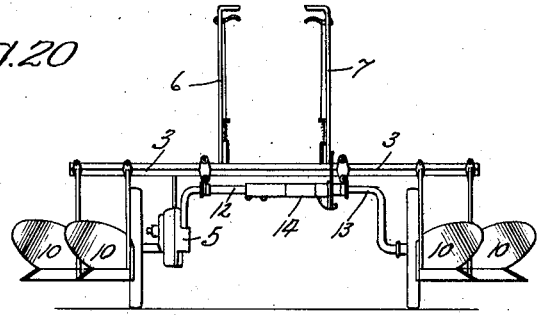
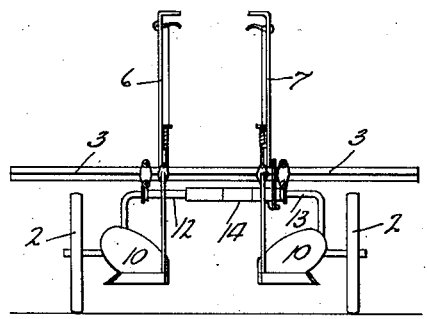
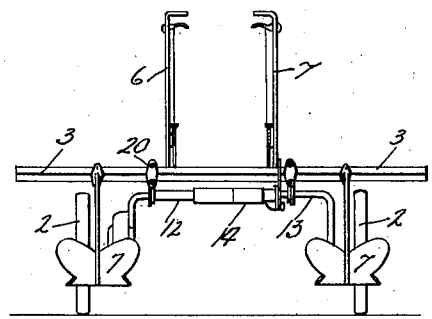
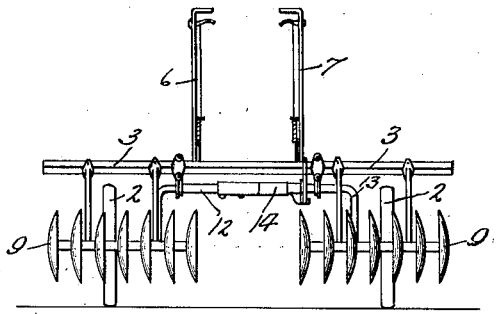

Patented Sept. 4, 1928.

1,683,018

UNITED STATES PATENT OFFICE.

JOSEPH E. BODA, OF MOLINE, ILLINOIS, ASSIGNOR, BY MESNE ASSIGNMENTS, TO MOLINE IMPLEMENT COMPANY, A CORPORATION OF ILLINOIS.

UNIVERSAL AGRICULTURAL IMPLEMENT.

Application filed September 25, 1922. Serial No. 590,314.

This invention relates to a universal agricultural implement.

It has heretofore been the practice to use a separate implement for each different kind of work on a farm. This means that there must be supporting wheels, frames, adjusting levers, and other mechanisms on each tool which are substantial duplicates of similar mechanisms on other tools. This duplication has been hard to eliminate because of the difficulty of producing a combination tool that would perform all the different tasks.

The present invention is directed toward providing a universal implement with only one set of supporting wheels and adjusting levers and one lifting mechanism, such implement to be used for various kinds of work by connecting various simple attachments to it designed for the various kinds of work it is desired to do.

The general object of the invention is to provide a simple, efficient, universal agricultural implement.

Other objects and advantages will hereinafter appear.

An embodiment of the invention is illustrated in the accompanying drawings in which—

Figure 1 is a side view of the implement connected to a tractor.

Figure 2 is a skeleton rear view illustrating several different kinds of tools that may be attached to the implement.

Figure 3 is a side view with the implement in raised position.

Figure 4 is a side view similar to Figure 3 with the implement in lowered position.

Figures 5 and 6 are details of the lifting connections.

Figure 7 is a plan view.

Figure 8 is a rear view showing the implement in lowered position.

Figures 10 and 11 are side views with the adjusting levers in one position and with some of the parts omitted showing the position of the parts, principally the lifting connections, with the implement in raised and lowered positions.

Figures 12 and 13 are side views with the adjusting levers in another position showing the position of the parts with the implement raised and lowered.

Figures 14 and 15 are side views with the adjusting levers in still another position showing the position of the parts with the implement in raised and lowered positions.

Figure 16 is a rear view showing one of the wheels raised and one lowered as the implement would be used in plowing.

Figure 17 is a perspective and Figure 18 is a side view of the adjusting connections.

Figure 19 illustrates two sections of the crank axle construction.

Figures 20, 21, 22 and 23 are skeleton rear views, illustrating different tool attachments connected to the implement.

Figure 9:
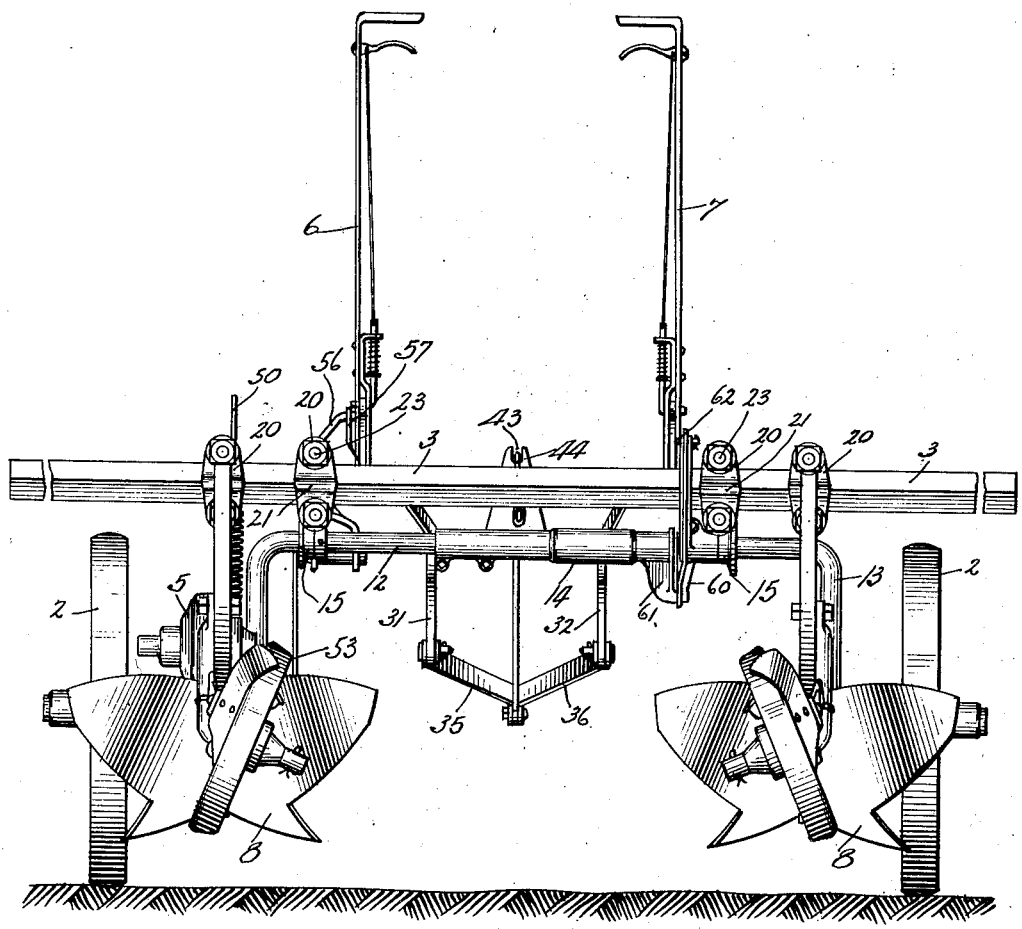
Figure 9 is a rear view showing the implement in raised position.

The implement is illustrated in connection with a tractor 1 of conventional type, but it is to be understood that it could be used with other types of tractors or draft devices.

It comprises, in general, a pair of ground wheels 2 supporting a tool bar 3 to which is connected a hitch 4 for attaching it to a tractor. The tool bar 3 may be raised and lowered by a powerlift mechanism 5, and adjusted to various positions by levers 6 and 7. Connected to the bar 3 are various tool attachments such as the lister plow attachment 7, illustrated in Figure 1, or the disc harrow attachment 9, the plows 10, or the drag harrow 11, illustrated in Figure 2.

The supporting wheels, which may be of any suitable type, are journaled on crank axles 12 and 13, the adjacent ends of which are received in a collar or sleeve 14, as shown in Figure 1 and illustrated in detail in Figures 17 and 19. Crank axle 12 is fixed to the sleeve, but axle 13 is free to turn within it, being prevented from moving longitudinally by a suitable key or other device. The crank axles are also journaled in bearing brackets 15 supported by the tool bar 3.

The tool bar 3 preferably comprises a heavy rectangular metal bar positioned so that two of its edges lie within a vertical plane passed through the axis of the bar.

The tool attachments are connected to the tool bar 3 by means of clamps 20 which clamp around the bar and hold the attachments firmly in position against movement in either vertical or horizontal planes and against any twisting or turning movement. The clamps preferably comprise two pieces, the piece 21 being formed or fixed rigidly to the attachment as illustrated in Figure 3 and the other piece 22 being loose, the two being clamped around the bar 3 by means of bolts 23. This type of tool carrying bar and the means for attaching the tools are simple and efficient and the result of a long line of experiments.

The draft is transmitted directly to the tool bar through two draft frame bars 31 and 32 attached to the tool bar by clamps 20 and converged forwardly and connected together toward their forward ends by a cross brace 33. The front ends of the bars 31 and 32 extend beyond the cross brace and are bent downwardly, as illustrated in Figure 3, the downward ends being provided with a series of holes 34 for the reception of the pins which pivot the draft hitch to them. The draft bars and their connections form what may be referred to, for convenience, as a draft frame or beam structure, but it will be observed that the implement does not have any distinct frame structure. It comprises simply a tool bar to which a draft means is connected, together with crank axles and ground wheels for supporting, raising, lowering, and adjusting the tool bar.

The draft hitch 4 comprises two bars 35 and 36 arranged to be connected to the bars 31 and 32 and converging forwardly to a point 37 where they are connected together. A releasable connection 38 and a clevice 39 connect the hitch to a tractor draw bar 40. Pivoted to the forward end of the draft hitch is link 41, to the rear end of which is connected a flexible chain 42, the links of which may be caught in a slot 43 in a catch plate 44 carried by the cross brace 33. The manner in which this draft device operates and its advantages will be later described.

The raising and lowering of the implement is effected by swinging the crank axles relative to the tool bar by means of the powerlift mechanism 3, which is of the type described in Boda Patent No. 1,565,619, Dec. 15, 1925, to which reference is made for details.

This powerlift mechanism comprises a clutch contained within the housing illustrated and driven by one of the supporting wheels. One member of the clutch is driven continuously by the wheel and the other member is driven from the first only when connected to it by tripping the lever 50 by means of a cord or chain 51 extending forwardly to the tractor. The second clutch member operates a crank 52 which is connected by links 53 and 54 to the draft frame, the link 54 being pivoted at the point 55 in a bearing bracket.

The positions of the parts when the machine is raised and lowered are illustrated in Figures 3, 4, 5 and 6. Figures 5 and 6 are views looking at the mechanism from the opposite side to that illustrated in Figures 3 and 4.

Figure 5 illustrates the parts when the implement is in raised position. With the parts in this position, if the clutch is tripped, the crank 52 will be moved in a counter-clockwise direction to the position shown in Figure 6. This results in swinging the crank axle 12 from the position shown in Figure 5 to that shown in Figure 6, thereby lowering the implement.

The depth to which the implement is lowered may be regulated by means of a link 56 connected to a member 57 carried by the adjusting lever 6. The construction is such that the implement will always be raised to substantially the same height above the ground from all its various depth positions. The details of this construction and an explanation of its action is contained in the co-pending applications referred to. Briefly, it may be explained by reference to Figures 5 and 6 in which the pivot 55 of link 54 may be considered a stationary pivot. The link is pivoted to the frame, and, in practice, the frame moves vertically instead of the ground wheels but, for purposes of explanation, it is clearer to consider that the frame remains stationary and that the wheels move vertically. It will be observed that, under these conditions, if the link 56 is pulled to the right in Figure 6, link 53 will be moved longitudinally and the right hand end of the crank axle 12 will be swung downwardly, it being understood that the crank 52 is stationary and that the powerlift mechanism is carried by the crank axle. However, if link 56 is pulled to the right when the parts are in raised position, as shown in Figure 5, such movement will have very little, if any, effect on the crank axle because the link 53 will be moved only through a small portion of the top of its arc so that very little longitudinal movement will result. This means that any adjustment of the lever 6 when the implement is lowered will have a material effect in raising or lowering the implement but, when the powerlift mechanism operates to move the parts to the position shown in Figure 5, the implement will be raised to substantially the same position above the ground from all depth positions because the position of the crank axle 12 when the implement is raised is substantially the same no matter in what position the link 54 may be adjusted.

At times, the right hand wheel of the implement, as viewed from the rear, will run in a furrow, in which event, the level of this wheel is from 4 to 8 inches lower than that of the left-hand wheel. Under such conditions, it is extremely desirable, if not necessary, to have the tool bar 3 level so that the tools connected to it will be in proper position. The construction for accomplishing this result is illustrated in detail in Figures 17, 18 and 19.

The crank axle 13, which is the axle carrying the furrow wheel, has a stop 60 fixed to it adapted to strike against a complementary stop 61 carried by the sleeve 14 which is keyed to the crank axle 12 so as to turn with it. Integral with the stop 60 is a curved arm 62 connected by a link 63 and a pin and slot connection 64 and 65 with the adjusting lever 7 pivoted to the draft bar 32 and operating over a toothed sector 66.

The weight of the parts tends to normally swing the crank axle 13 forwardly, or in a counter-clockwise direction as viewed in Figure 17, thereby normally maintaining the stop 60 in contact with the stop 61. The movement of the crank axle 13 in a counter-clockwise direction may be stopped at any desired point, however, by positioning the lever 7 so that the end 67 of the slot 65 contacts the pin 64 on the adjusting lever. As illustrated, the lever is in a position to permit the axle to move to its extreme lowered position but, if the lever is moved clockwise as viewed in Figure 17 to another position, it will stop the crank axle before it reaches the limit of its movement. In this manner, the furrow wheel may be adjusted so as to compensate for the differences in the level of the ground upon which it must run as compared with the land wheel.

This adjustment of the furrow wheel does not interfere with the lifting of the implement. No matter what the adjustment may be, the tool bar is always lifted to a substantially level position and, as previously explained, to substantially the same height above the ground.

Various adjusted positions of the furrow wheel are shown in Figures 10 to 15 inclusive.

Figures 10 and 11 illustrate the position of the parts with both of the levers 6 and 7 in their extreme vertical position, that is, the lever 6 is positioned so that the implement will work at its greatest depth and the lever 7 is positioned so that the land wheel will be on substantially the same level as the furrow wheel.

Figures 12 and 13 illustrate the position of the parts with the lever 7 in its mid position, the lever 6 still remaining in its extreme vertical position. This leaves the implement set to work at the same depth as in the first two figures, but the furrow wheel is adjusted to compensate for a difference in level between itself and the land wheel.

Figures 14 and 15 illustrate the position of the parts with the lever 7 still remaining in mid position and the lever 6 moved to its other extreme position, that is, the position to cause the implement to work at its shallowest depth.

In the position illustrated in Figures 10 and 11, the stops 60 and 61 are in contact and they continue in contact through all movements of the crank axles.

In the positions shown in Figures 12 and 13, the stops 60 and 61 are separated in Figure 13 when the machine is lowered, because the furrow wheel crank axle has been stopped by the setting of lever 7. When the crank axle 12 is swung to raise the implement from the position shown in Figure 13 to that shown in Figure 12, it moves independently in a clockwise direction until the stop 60 engages the stop 61, whereupon the furrow wheel crank axle 13 will be picked up and both will be swung together. In this way the crank axles assume their original position and maintain the tool bar 3 level when the implement is raised.

In the position of the parts shown in Figures 14 and 15, the stops 60 and 61 are separated when the implement is lowered as shown in Figure 15 because the furrow wheel crank axle 12 is stopped by the setting of lever 7. The stops may not be separated as far as in Figure 13 because the crank axle 12 is not swung so far in a clockwise direction due to the setting of lever 6, but when the powerlift mechanism is operated to lift the implement, the same action takes place as is in the case in Figures 12 and 13, that is, the furrow wheel crank axle is picked up by the land wheel crank axle after the difference in adjustment between them has been taken up by the movement of the land wheel crank axle.

The operation and advantages of the draft connection as related to the lifting of the implement are as follows:

When the crank axles are swung to lift the implement with the tools in the ground, the tendency is for the front end of the implement to raise first. At the beginning of the movement, the draft device is in the position illustrated in Figure 4 but, as the front end of the implement lifts, this draft device assumes the position shown in Figure 3, that is, the link 40 and chain 41 straighten out and become taut, thereby bracing the front end of the implement and preventing any further upward movement, because, of course, the front end of the draft device is connected to the tractor. As the crank axles continue to swing, and after the front end of the implement is braced, the rear end of the implement must raise and the tools are thereby lifted out of the ground. The raised position of the implement is illustrated in Figure 3 in which it will be observed that the implement comprises, when lifted, a two-wheel cart attached to the tractor. This makes transportation easy because it facilitates turning and it permits the tractor to be backed with the implement attached, both of which advantages are important ones in the practical use of a device of this kind.

When the implement is lowered, the hitch assumes the position shown in Figure 3 in which position it is flexible, that is, the front end of the implement is not braced against movement but may adjust itself in connection with the hitch to give the most efficient draft line. In other words, this hitch is flexible at a time when flexibility is desired and it automatically becomes rigid at the time when rigidity is demanded.

Another advantage of the hitch is that the front end of the implement may be forced downwardly and the chain 41 hooked up much shorter thereby holding the rear end of the implement raised for purposes of inspection or adjustment. This is very advantageous for changing shares on plows, etc.

The implement has been constructed with particular reference to simplicity and ease of manufacture as well as efficiency of operation. It will be observed that there are very few parts and that the parts are relatively simple, but that, nevertheless, they are so coordinated that all the desired results are obtained.

A large variety of tools may be connected to the tool bar 3 in many different ways; for example, lister plows as may be used as illustrated in Figures 7 and 8, or the usual gang plows may be used as illustrated in Figure 16. Several different kinds may be used at the same time as illustrated in Figure 2. The various plows that may be used can be adjusted at different distances apart as illustrated in Figures 21 and 22 or the implement may be used for vineyard or orchard plowing as illustrated in Figure 20. Disc attachments may be employed as illustrated in Figure 3 and these may be set at any desired distance apart.

It will be observed that the hitch and draft connections are connected directly to the tool carrying bar 3. The pull of the draft device is directly upon the bar, the supporting wheels with the lifting mechanism merely acting to guide the bar and hold it at the desired position above the ground.

It is to be understood that the construction shown is for purposes of illustration only and that variations may be made therein without departing from the spirit and scope of the invention as defined by the claims.

I claim:

1. A universal agricultural implement comprising an independent unit of the drag-behind type adapted to be connected to a source of draft power and to be adjusted and controlled by an operator from a position on a source of draft power ahead of the implement, said implement having a tool supporting means to which a wide variety of agricultural tools, including heavy tools such as plows, may be adjustably and detachably connected, crank axles carrying ground wheels for suporting the implement, means for adjusting the crank axles relative to one another to maintain the tool suporting means level when one of the wheels runs on a lower level than the other, draft connections for connecting said tool supporting means to a source of draft power to pull the implement, powerlift mechanism operated by travel of the implement for swinging the crank axles to raise and lower the implement, and controlling means for the powerlift mechanism, said controlling means and the adjusting means for the crank axles including elements that may be easily manipulated from a position on a source of draft power to which the implement may be connected.

2. A universal agricultural implement comprising an independent unit of the drag-behind type adapted to be connected to a source of draft power and to be adjusted and controlled by an operator from his normal position on a source of draft power ahead of the implement, said implement having tool supporting means to which a wide variety of agricultural tools, including heavy tools such as plows, may be adjustably and detachably connected, crank axles carrying ground wheels for supporting the implement, means for adjusting the crank axles to vary the working depth of the implement and to maintain the tool supporting means level when one of the ground wheels runs on a level lower than the other, draft connections for connecting said tool supporting means to a source of draft power to pull the implement, powerlift mechanism operated by the travel of one or more of the ground wheels for swinging the crank axles to raise and lower the tool supporting means, said powerlift mechanism including means serving to raise the tool supporting means to substantially the same height above the ground from all its working positions, and controlling means for the powerlift mechanism, said controlling means and the adjusting means for the crank axles including elements located at the forward end of the implement where they may be easily manipulated from a position on a source of draft power to which the implement may be connected.

3. A universal agricultural implement comprising an independent unit of the drag-behind type adapted to be connected to a source of draft power and to be adjusted and controlled by an operator from a position on a source of draft power ahead of the implement, said implement having a tool supporting means to which a wide variety of agricultural tools, including heavy tools such as plows, may be adjustably and detachably connected, crank axles carrying ground wheels for supporting the implement, means for adjusting the crank axles to vary the working depth of the implement and to maintain the tool supporting means level when one of the ground wheels must run on a lower level than the other, draft connections for connecting said tool supporting means to a source of draft power to pull the implement, powerlift mechanism operated by the travel of one or more of the ground wheels for swinging the crank axles to raise and lower the tool supporting means, said powerlift mechanism and the means for adjusting the crank axles including elements serving to raise the tool supporting means to substantially the same height above the ground and to a level position from all the working positions of the implement, and controlling means for the powerlift mechanism, said controlling means and the adjusting means including elements located at the forward end of the implement where they may be easily manipulated by an operator from a position on a source of draft power to which the implement may be connected.

4. A universal agricultural implement comprising an independent unit of the drag-behind type adapted to be connected to a source of draft power and to be adjusted and controlled by an operator from a position on a source of draft power ahead of the implement, said implement having a single tool bar to which a wide variety of agricultural tools, including heavy tools such as plows, may be adjustably and detachably connected, draft connections for connecting said tool bar to a source of draft power, crank axles carrying ground wheels for supporting the tool bar, powerlift mechanism operated by travel of the implement for swinging the crank axles to raise and lower the tool bar, means for adjusting the crank axles relative to one another to maintain the tool bar level when one of the ground wheels is required to run in a furrow, and controlling means for the powerlift mechanism, said controlling means and the adjusting means for the crank axles including devices by means of which they may be easily manipulated by an operator from his position on a source of draft power to which the implement may be connected.

5. A universal agricultural implement comprising an independent unit of the drag-behind type adapted to be connected to a source of draft power and to be adjusted and controlled by an operator from a position on a source of draft power ahead of the implement, said implement having a single, rectangular tool bar positioned with two of its edges in a substantially vertical plane so that a wide variety of tools, including heavy tools such as plows, may be adjustably and detachably clamped to the bar, draft connections for connecting said bar to a source of draft power, crank axles carrying ground wheels for supporting the bar, means for adjusting the crank axles relative to one another to maintain the tool bar level when one of the wheels is required to run in a furrow, powerlift mechanism operated by travel of the implement for swinging the crank axles to raise and lower the tool bar, and controlling means for the powerlift mechanism, said controlling means and the means for adjusting the crank axles including portions by means of which they may be easily manipulated by an operator from a position on a source of draft power to which the implement may be connected.

6. A universal agricultural implement comprising an independent unit of the drag-behind type adapted to be connected to a source of draft power and to be adjusted and controlled by an operator from a position on a source of draft power ahead of the implement, said implement having a tool supporting means to which a wide variety of tools, including heavy tools such as plows, may be adjustably and detachably connected, a wheeled support for the implement, means for adjusting the implement to vary the working position of the tool supporting means and to maintain the supporting means level when one of the wheels of the wheeled support is lower than the other, powerlift mechanism operated by the travel of the implement for raising and lowering the tool supporting means, draft connections for connecting the tool supporting means to a source of draft power, said draft connections including a hitch device which is flexible when the implement is in lowered or working position to thereby provide a draft connection which can easily adjust itself to the line of draft but which forms a brace to limit the upward movement of the forward end of the implement as the implement is raised, and means for controlling the powerlift mechanism, said controlling and adjusting means including elements which may be easily manipulated by an operator from a position on a source of draft power to which the implement may be connected.

7. A frameless, universal, agricultural implement having a draft structure, the front end of which has a hitch for connecting it to a source of draft power such as a tractor or the like so that the implement is pulled and stabilized through such connection, and the rear end of which has a connecting means for adjustably and detachably connecting it to a wide variety of agricultural tools, including heavy tools such as plows, a two-wheel supporting means for the rear of the draft structure, means for quickly adjusting the implement to vary its working depth and to maintain the draft structure level when the implement is in working position with one of its wheels on a lower level than the other, and powerlift mechanism operated by the travel of the implement for raising and lowering it.

8. A frameless, universal agricultural implement having a draft structure to the rear end of which a wide variety of agricultural tools including heavy tools such as plows may be adjustably and detachably connected, crank axles carrying ground wheels for sustaining the rear end of the draft structure, means for adjusting the crank axles to vary the working depth of the implement and to maintain the draft structure level when the implement is in working position with one of its ground wheels on a lower level than the other, powerlift mechanism operated by travel of the implement for swinging the crank axles to raise and lower the draft structure, said crank axles being located relative to the draft structure so that, as they are swung, the front end of the structure tends to raise first, and a hitch device for connecting the draft structure to a source of draft power such as a tractor or the like so that the implement is pulled and stabilized through such connection, said hitch device including means and connections which render it flexible when the implement is in lowered or operating position to thereby permit it to adjust itself to a low draft line, and which causes it to act automatically, as the implement is raised, to limit the upward movement of the front end of the implement to thereby cause the final swinging of the crank axles to raise the rear end of the implement clear of the ground and transform it to a two-wheeled, cart-like structure for transportation purposes.

9. A frameless, universal agricultural implement having a single tool bar to which a wide variety of agricultural tools may be adjustably and detachably connected, draft connections for connecting said bar to a source of draft power such as a tractor or the like, crank axles carrying ground wheels for supporting the tool bar, means for adjusting the crank axles to vary the working position of the tool bar and to maintain the tool bar level when the implement is in working position with one ground wheel on a lower level than the other, and powerlift mechanism operated by travel of the implement for swinging the crank axles to raise and lower the bar.

10. A universal agricultural implement having a single tool bar to which a wide variety of agricultural tools may be adjustably and detachably connected, draft connections for connecting said bar to a source of draft power such as a tractor or the like, crank axles carrying ground wheels for supporting the bar, powerlift mechanism operated by the travel of the implement for swinging the crank axles to raise and lower the bar, means for adjusting the crank axles to vary the depth of working of the implement and to maintain the tool bar level when the implement is in working position with one of its ground wheels lower than the other, said powerlift mechanism and the adjusting means being constructed and co-ordinated so that, when the implement is raised by the powerlift, the bar is lifted to substantially the same height above the ground and to a level position from all its working positions.

11. A frameless universal agricultural implement having a draft structure the front end of which has a hitch for connecting it to a source of draft power such as a tractor or the like so that the implement is pulled and stabilized through such connection, and the rear end of which carries a single tool bar to which a wide variety of agricultural tools, including heavy tools such as plows, may be adjustably and detachably connected, crank axles carrying ground wheels for supporting the rear end of the draft structure, means for quickly adjusting the crank axles to vary the working position of the tool bar and to maintain the tool bar level when the implement is in working position with one of the wheels lower than the other, and powerlift mechanism operated by the travel of one or more of the ground wheels for swinging the crank axles to raise and lower the rear end of the implement.

12. A universal agricultural implement having a single tool bar to which a wide variety of agricultural tools, including heavy tools such as plows, may be adjustably and detachably connected, draft beams adjustably and detachably connected to the tool bar and extending forwardly, a pair of crank axles adjustably and detachably connected to the tool bar and carrying ground wheels for supporting the implement, means for adjusting the crank axles to vary the height of the tool bar and to vary the position of one crank axle relative to the other, a powerlift mechanism operated by travel of one or more of the ground wheels for swinging the crank axles to raise and lower the implement, and a hitch device connected to the forward ends of the draft beams and serving as a flexible hitch when the implement is lowered, but acting to limit the upward movement of the forward end of the implement as the implement is raised.

13. A universal agricultural implement having a tool supporting means to which a wide variety of agricultural tools, including heavy tools such as plows, may be adjustably and detachably connected, draft connections for connecting said tool supporting means to a source of draft power such as a tractor or the like, a pair of crank axles carrying ground wheels for supporting the implement, a powerlift mechanism carried by one of the crank axles and operated by the travel of its ground wheel, linkage connections between the powerlift mechanism and the implement, means for adjusting the linkage connections to vary the working position of the implement, said adjusting means and linkage connections being constructed and coordinate so that, when the implement is raised, adjustments do not vary the position of the crank axle but, when the implement is lowered, adjustments vary the position of the crank axle to effect the working depth, adjustable connections between the crank axles by means of which their position relative to one another may be varied, said adjustable connections including elements which act, when the powerlift mechanism swings one crank axle, to swing the other crank axle to a raised position which brings the tool supporting means to a level position from all the adjusted working positions of the crank axles.

14. A universal agricultural implement comprising a single tool bar to which a wide variety of agricultural tools, including heavy tools such as plows, may be adjustably and detachably connected, a pair of draft beams connected to said tool bar and extending forwardly, the forward ends of said draft beams being connected together and having downwardly extending portions, a pair of crank axles pivotally connected to the implement and carrying ground wheels, means for adjusting the crank axles to vary the depth of working of the implement and to vary the relative positions of the crank axles so that one of the ground wheels may run on a lower level than the other and the tool bar be maintained level, said adjusting means including operating members located at the forward ends of the draft beams where they are available for ready operation by an operator seated on a source of draft power such as a tractor to which the implement may be connected, powerlift mechanism operated by travel of one or more of the ground wheels for swinging the crank axles to raise and lower the implement, a hitch device pivoted to the forward ends of the draft beams and acting as a flexible hitch which adjusts itself to the line of draft when the implement is in working position but serving to automatically limit the upward movement of the forward end of the implement as the implement is raised by the powerlift mechanism, and controlling means for the powerlift mechanism.

In testimony whereof, I affix my signature.

JOSEPH E. BODA.